(12) United States Patent
Kovach

(10) Patent No.: US 11,730,076 B2
(45) Date of Patent: Aug. 22, 2023

(54) CONTROL SYSTEM FOR AN AGRICULTURAL IMPLEMENT

(71) Applicant: CNH Industrial America LLC, New Holland, PA (US)

(72) Inventor: Michael George Kovach, Morton, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 555 days.

(21) Appl. No.: 16/830,373

(22) Filed: Mar. 26, 2020

(65) Prior Publication Data

US 2021/0298216 A1   Sep. 30, 2021

(51) Int. Cl.
  *A01B 63/111*    (2006.01)
  *A01B 63/22*     (2006.01)
  (Continued)

(52) U.S. Cl.
  CPC ........ *A01B 63/1112* (2013.01); *A01B 49/027* (2013.01); *A01B 63/008* (2013.01);
  (Continued)

(58) Field of Classification Search
  CPC ... A01B 49/027; A01B 63/008; A01B 63/111; A01B 63/1112; A01B 63/1115;
  (Continued)

(56) References Cited

U.S. PATENT DOCUMENTS

| 3,642,087 A | 2/1972 | Sampey |
| 4,413,685 A | 11/1983 | Gremelspacher et al. |

(Continued)

FOREIGN PATENT DOCUMENTS

| CN | 105783839 | 7/2016 |
| CN | 109588075 | 4/2019 |

(Continued)

OTHER PUBLICATIONS

Wikipedia article, "Sonar", Old revision dates Mar. 25, 2020, 17 pages (Year: 2020).*

(Continued)

*Primary Examiner* — David A Testardi
(74) *Attorney, Agent, or Firm* — Rebecca Henkel; Rickard DeMille

(57) ABSTRACT

An orientation control system for an agricultural implement includes a first sensor configured to emit a first output signal toward a soil surface and to receive a first return signal indicative of a first height of a first portion of a frame. The orientation control system also includes a second sensor configured to emit a second output signal toward the soil surface and to receive a second return signal indicative of a second height of a second portion of the frame. In addition, the orientation control system includes a first actuator, a second actuator, and a controller configured to control the first and second actuators such that a difference between the first height and a first target height is less than a first threshold value and a difference between the second height and a second target height is less than a second threshold value.

9 Claims, 4 Drawing Sheets

(51) Int. Cl.
*A01B 49/02* (2006.01)
*A01B 63/00* (2006.01)
*A01C 5/06* (2006.01)
*G01B 7/02* (2006.01)
*G01S 13/08* (2006.01)
*G01S 15/08* (2006.01)
*G01S 17/08* (2006.01)

(52) U.S. Cl.
CPC .............. *A01B 63/22* (2013.01); *A01C 5/068* (2013.01); *G01B 7/023* (2013.01); *G01S 13/08* (2013.01); *G01S 15/08* (2013.01); *G01S 17/08* (2013.01)

(58) Field of Classification Search
CPC ... A01B 63/1117; A01B 63/114; A01B 63/22; A01B 63/32; A01B 59/042; A01C 5/062; A01C 7/203
See application file for complete search history.

(56) References Cited

U.S. PATENT DOCUMENTS

| | | | |
|---|---|---|---|
| 4,491,183 A | 1/1985 | Anderson et al. | |
| 4,679,633 A | 7/1987 | Kauss | |
| 4,775,940 A | 10/1988 | Nishida et al. | |
| 4,776,153 A | 10/1988 | DePauw et al. | |
| 4,821,806 A * | 4/1989 | Winter | A01B 63/22 280/43.23 |
| 5,060,205 A | 10/1991 | Phelan | |
| 5,430,651 A | 7/1995 | Nielsen et al. | |
| 5,488,817 A | 2/1996 | Paquet et al. | |
| 5,535,577 A | 7/1996 | Chmielewski et al. | |
| 5,621,666 A | 4/1997 | O'Neall et al. | |
| 5,711,139 A | 1/1998 | Swanson | |
| 5,794,421 A | 8/1998 | Maichle | |
| 6,076,611 A | 6/2000 | Rozendaal et al. | |
| 6,089,327 A | 7/2000 | Kimura et al. | |
| 6,131,919 A | 10/2000 | Lee et al. | |
| 6,164,385 A | 12/2000 | Buchi | |
| 6,216,794 B1 | 4/2001 | Buchi | |
| 6,222,628 B1 | 4/2001 | Corallo et al. | |
| 6,305,478 B1 | 10/2001 | Friggstad | |
| 6,588,187 B2 | 7/2003 | Engelstad et al. | |
| 6,698,524 B2 | 3/2004 | Bernhardt et al. | |
| 6,813,873 B2 | 11/2004 | Allwörden et al. | |
| 6,990,390 B2 | 1/2006 | Groth et al. | |
| 7,028,554 B2 | 4/2006 | Adamchuk et al. | |
| 7,063,167 B1 | 6/2006 | Staszak et al. | |
| 7,540,129 B2 | 6/2009 | Kormann | |
| 7,540,130 B2 | 6/2009 | Coers et al. | |
| 7,748,264 B2 | 7/2010 | Prem | |
| 7,866,671 B2 | 1/2011 | Madler | |
| 7,870,709 B2 | 1/2011 | Digman | |
| 8,573,319 B1 | 11/2013 | Casper et al. | |
| 8,720,170 B2 | 5/2014 | Deneault et al. | |
| 8,751,147 B2 | 6/2014 | Colwell | |
| 8,752,642 B2 | 6/2014 | Whalen et al. | |
| 8,827,001 B2 | 9/2014 | Wendte et al. | |
| 8,843,283 B2 | 9/2014 | Strelioff et al. | |
| 8,857,530 B2 | 10/2014 | Henry | |
| RE45,303 E | 12/2014 | Henry et al. | |
| 8,977,441 B2 | 3/2015 | Grimes et al. | |
| 9,026,321 B2 | 5/2015 | Henry et al. | |
| 9,301,439 B2 | 4/2016 | Gilstring | |
| 9,351,443 B2 | 5/2016 | Miller et al. | |
| 9,405,039 B2 | 8/2016 | Anderson | |
| 9,481,294 B2 | 11/2016 | Sauder et al. | |
| 9,510,498 B2 | 12/2016 | Tuttle et al. | |
| 9,516,802 B2 | 12/2016 | Zemenchik | |
| 9,554,098 B2 | 1/2017 | Casper et al. | |
| 9,554,504 B2 | 1/2017 | Houck | |
| 9,585,298 B2 | 3/2017 | Henry et al. | |
| 9,585,307 B2 | 3/2017 | Holland | |
| 9,693,496 B2 | 7/2017 | Tevs et al. | |
| 9,706,696 B2 | 7/2017 | Gschwendtner | |
| 9,750,174 B2 | 9/2017 | Sauder et al. | |
| 9,801,329 B2 | 10/2017 | Zielke | |
| 9,861,022 B2 | 1/2018 | Bassett | |
| 9,980,422 B2 | 5/2018 | Czapka et al. | |
| 10,045,474 B2 | 8/2018 | Bachman et al. | |
| 10,104,822 B2 | 10/2018 | Couchman | |
| 10,123,475 B2 | 11/2018 | Posselius et al. | |
| 10,178,823 B2 | 1/2019 | Kovach et al. | |
| 10,219,421 B2 | 3/2019 | Achen et al. | |
| 10,820,476 B2 | 11/2020 | Stoller et al. | |
| 2010/0017075 A1 | 1/2010 | Beaujot | |
| 2012/0227992 A1* | 9/2012 | Henry | A01B 63/114 172/4 |
| 2013/0068489 A1 | 3/2013 | Blunier et al. | |
| 2013/0112123 A1* | 5/2013 | Turko | A01B 61/046 111/151 |
| 2013/0112124 A1* | 5/2013 | Bergen | A01C 5/06 111/151 |
| 2013/0341056 A1* | 12/2013 | Casper | A01B 63/111 172/4 |
| 2016/0029547 A1 | 2/2016 | Casper et al. | |
| 2016/0183446 A1* | 6/2016 | Achten | A01B 63/145 172/2 |
| 2017/0064900 A1 | 3/2017 | Zemenchik | |
| 2017/0105331 A1* | 4/2017 | Herlitzius | B62D 49/00 |
| 2017/0251587 A1* | 9/2017 | Sporrer | A01B 15/14 |
| 2017/0325393 A1* | 11/2017 | Gschwendtner | E02F 9/2025 |
| 2017/0339819 A1* | 11/2017 | Kowalchuk | A01C 5/068 |
| 2017/0359941 A1* | 12/2017 | Czapka | A01B 59/042 |
| 2018/0114305 A1 | 4/2018 | Strnad et al. | |
| 2018/0153088 A1* | 6/2018 | Sporrer | A01B 63/008 |
| 2018/0206393 A1* | 7/2018 | Stoller | A01C 21/005 |
| 2018/0220577 A1 | 8/2018 | Posselius et al. | |
| 2018/0249622 A1* | 9/2018 | Sporrer | A01B 63/22 |
| 2018/0279543 A1 | 10/2018 | Kovach | |
| 2018/0299422 A1 | 10/2018 | Pregesbauer | |
| 2018/0303022 A1 | 10/2018 | Barrick et al. | |
| 2018/0310460 A1* | 11/2018 | Stovall | A01B 79/005 |
| 2018/0310465 A1 | 11/2018 | Peterson et al. | |
| 2018/0310466 A1 | 11/2018 | Kovach et al. | |
| 2018/0340845 A1 | 11/2018 | Rhodes et al. | |
| 2019/0008088 A1 | 1/2019 | Posselius et al. | |
| 2019/0059198 A1 | 2/2019 | Schnaider et al. | |
| 2019/0126912 A1* | 5/2019 | Peterson | A01B 63/22 |
| 2019/0235529 A1 | 8/2019 | Barrick et al. | |
| 2019/0246548 A1 | 8/2019 | Kovach et al. | |
| 2020/0000005 A1 | 1/2020 | Stanhope et al. | |
| 2020/0015406 A1* | 1/2020 | Wright | A01C 7/203 |
| 2020/0060062 A1 | 2/2020 | Sporrer et al. | |
| 2020/0084954 A1* | 3/2020 | Sporrer | A01B 49/027 |
| 2020/0093052 A1 | 3/2020 | Preimess et al. | |
| 2020/0100419 A1 | 4/2020 | Stanhope | |
| 2020/0100420 A1* | 4/2020 | Sporrer | A01B 63/16 |
| 2020/0337206 A1 | 10/2020 | Hertzog et al. | |
| 2021/0045280 A1 | 2/2021 | Ehlert et al. | |
| 2021/0068331 A1* | 3/2021 | Sporrer | A01B 63/16 |
| 2021/0092892 A1 | 4/2021 | Pregesbauer | |
| 2021/0105928 A1* | 4/2021 | Henry | A01B 63/245 |
| 2021/0368669 A1* | 12/2021 | Brinker | A01B 63/008 |

FOREIGN PATENT DOCUMENTS

| | | | |
|---|---|---|---|
| EP | 1273216 | 1/2003 | |
| EP | 1273216 A1 * | 1/2003 | ............ A01B 63/32 |
| EP | 3305052 | 4/2018 | |
| JP | H02167004 | 6/1990 | |
| JP | 2969808 | 11/1999 | |
| JP | H11321634 | 11/1999 | |
| JP | 2002165510 | 6/2002 | |
| JP | 2005095045 | 4/2005 | |
| WO | 2017158006 | 9/2017 | |
| WO | WO2017197274 | 11/2017 | |

(56) References Cited

FOREIGN PATENT DOCUMENTS

| WO | WO2018018050 | 1/2018 |
|---|---|---|
| WO | 2019158454 | 8/2019 |

OTHER PUBLICATIONS

Gilliot et al., "Soil Surface Roughness Measurement: A New Fully Automatic Photogrammetric Approach Applied to Agricultural Bare Fields," Computers and Electronics in Agriculture, Jan. 23, 2017, pp. 63-78, Elsevier, https://www.researchgate.net/publication/312651105_Soil_surface_roughness_measurement_A_new_fully_automatic_photogrammetric_approach_applied_to_agricultural_bare_fields.

Hart-Carter Co., "Automatic Header Adjustment," Farm Show Magazine, 1984, p. 33, vol. 8, Issue #6.

Raper et al., "A Portable Tillage Profiler for Measuring Subsoiling Disruption," American Society of Agricultural Engineers, 2004, pp. 23-27, vol. 47(1), https://www.ars.usda.gov/ARSUserFiles/60100500/csr/ResearchPubs/raper/raper_04a.pdf.

Yasin et al., "Non-Contact System for Measuring Tillage Depth," Computers and Electronics in Agriculture, 1992, pp. 133-147, https://www.researchgate.net/publication/229318888_Non-contact_system_for_measuring_tillage_depth.

Peteinatos et al., "Precision Harrowing With a Flexible Tine Harrow and an Ultrasonic Sensor," Jul. 2015, Precision Agricultural, pp. 579-586, https://www.researchgate.net/publication/281437517_Precision_harrowing_with_a_lexible_tine_harrow_and_an_ultrasonic_sensor.

"Tiger-Mate® 255 Field Cultivator," 2017, Case IH Agriculture, 24 pgs.

"Ecolo-Tiger® 875 Disk Ripper," 2018, Case IH Agriculture, 16 pgs.

U.S. Appl. No. 16/830,531, filed Mar. 26, 2020, Michael George Kovach.

U.S. Appl. No. 16/830,331, filed Mar. 26, 2020, Michael George Kovach.

U.S. Appl. No. 16/830,335, filed Mar. 26, 2020, Michael George Kovach.

U.S. Appl. No. 16/830,344, filed Mar. 26, 2020, Michael George Kovach.

U.S. Appl. No. 16/830,410, filed Mar. 26, 2020, Michael George Kovach.

EP Application No. 21165028.8 Extended Search Report, dated Dec. 10, 2021, 13 pgs.

EP Application No. 21165022.1, Search Report dated Aug. 6, 2021, 8 pgs.

EP Application No. 21165029.6, Search Report dated Aug. 6, 2021, 7 pgs.

EP Application No. 21165028.8, Search Report dated Aug. 9, 2021, 14 pgs.

EP Application No. 21165025.4, Search Report dated Aug. 6, 2021, 9 pgs.

EP Application No. 19171136.5 Extended European Search Report dated Nov. 6, 2019, 22 pgs.

* cited by examiner

CONTROL SYSTEM FOR AN AGRICULTURAL IMPLEMENT

BACKGROUND

The present disclosure relates generally to an orientation control system for an agricultural implement.

Certain agricultural implements include ground engaging tools configured to interact with the soil. For example, a tillage implement may include tillage points and/or disc blades configured to break up the soil for subsequent planting or seeding operations. Certain tillage implements include a depth adjustment mechanism configured to control a penetration depth of the ground engaging tools into the soil. For example, an agricultural implement may include a turnbuckle extending between a hitch assembly and a frame of the tillage implement. The turnbuckle may be adjusted to set the height of the frame relative to the surface of the soil, thereby setting the penetration depth of the ground engaging tools to a target penetration depth. However, during operation, the height of certain portion(s) of the frame above the soil surface may vary due to variations in the soil surface. As a result, the penetration depth of ground engaging tools positioned at the portion(s) of the agricultural implement frame may vary significantly from the target penetration depth. Therefore, the effectiveness of the tillage operation may be substantially reduced.

BRIEF DESCRIPTION

In certain embodiments, an orientation control system for an agricultural implement includes a first sensor configured to be positioned at a first portion of a frame of the agricultural implement proximate to a first ground engaging tool. The first sensor is configured to be directed toward a soil surface, and the first sensor is configured to emit a first output signal toward the soil surface and to receive a first return signal indicative of a first height of the first portion of the frame above the soil surface. The orientation control system also includes a second sensor configured to be positioned at a second portion of the frame proximate to a second ground engaging tool. The second sensor is configured to be directed toward the soil surface, and the second sensor is configured to emit a second output signal toward the soil surface and to receive a second return signal indicative of a second height of the second portion of the frame above the soil surface. In addition, the orientation control system includes a first actuator configured to be coupled to a hitch assembly of the agricultural implement. The first actuator is configured to control a position of a hitch of the hitch assembly relative to the frame along a vertical axis. The orientation control system also includes a second actuator configured to be coupled to a wheel assembly of the agricultural implement. The second actuator is configured to control a position of the wheel assembly relative to the frame along the vertical axis. Furthermore, the orientation control system includes a controller comprising a memory and a processor. The controller is communicatively coupled to the first sensor, to the second sensor, to the first actuator, and to the second actuator, the controller is configured to control the first and second actuators such that a difference between the first height and a first target height is less than a first threshold value and a difference between the second height and a second target height is less than a second threshold value, and the first target height is different than the second target height.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
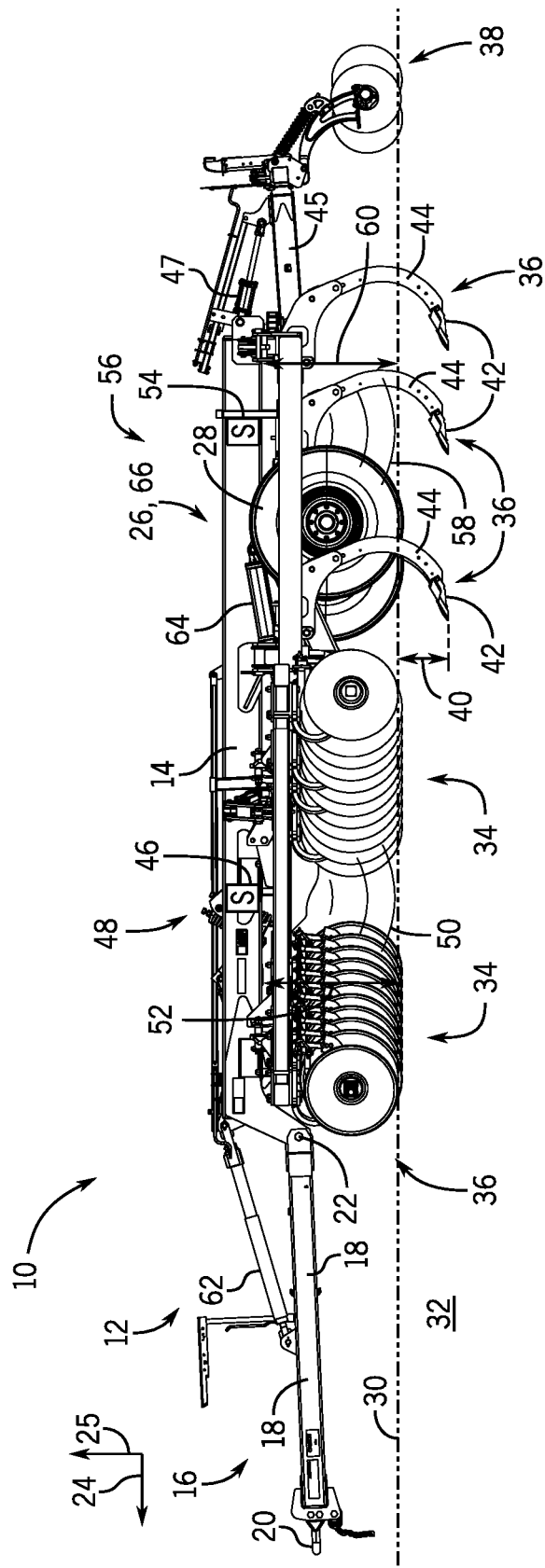
FIG. 1 is a side view of an embodiment of an agricultural implement having an orientation control system.

FIG. 1 is a side view of an embodiment of an agricultural implement 10 having an orientation control system 12 (e.g., control system). In the illustrated embodiment, the agricultural implement 10 is a primary tillage implement having multiple ground engaging tools configured to till soil. As illustrated, the agricultural implement 10 includes a frame 14 and a hitch assembly 16 coupled to the frame 14. The frame 14 is substantially rigid (e.g., does not include any translatable and/or rotatable components) and formed from multiple frame elements (e.g., rails, tubes, braces, etc.) coupled to one another (e.g., via welded connection(s), via fastener(s), etc.). The hitch assembly 16 includes a hitch frame 18 and a hitch 20. The hitch frame 18 is pivotally coupled to the implement frame 14 via pivot joint(s) 22, and the hitch 20 is configured to couple to a corresponding hitch of a work vehicle (e.g., tractor), which is configured to tow the agricultural implement 10 through a field along a direction of travel 24. While the hitch frame 18 is pivotally coupled to the implement frame 14 in the illustrated embodiment, in other embodiments, the hitch frame may be movably coupled to the implement frame by a linkage assembly (e.g., four bar linkage assembly, etc.) or another suitable assembly/mechanism that enables the hitch to move along a vertical axis 25 relative to the implement frame.

As illustrated, the agricultural implement 10 includes wheel assemblies 26 movably coupled to the implement frame 14. In the illustrated embodiment, each wheel assembly 26 includes a wheel frame and a wheel 28 rotatably coupled to the wheel frame. The wheels 28 of the wheel assemblies 26 are configured to engage the surface 30 of the soil 32, and the wheel assemblies 26 are configured to support at least a portion of the weight of the agricultural implement 10. In the illustrated embodiment, each wheel frame is pivotally coupled to the implement frame 14, thereby facilitating adjustment of the position of each wheel 28 along the vertical axis 25. However, in other embodiments, at least one wheel frame may be movably coupled to the implement frame by another suitable connection (e.g., sliding connection, linkage assembly, etc.) that facilitates adjustment of the vertical position of the respective wheel(s).

In the illustrated embodiment, the agricultural implement 10 includes ground engaging tools, such as the illustrated disc blades 34, tillage point assemblies 36, and finishing discs 38. The disc blades 34 are configured to engage a top layer of the soil 32. As the agricultural implement 10 is towed through the field, the disc blades 34 are driven to rotate, thereby breaking up the top layer. In the illustrated embodiment, the disc blades 34 are arranged in two rows. However, in alternative embodiments, the disc blades may be arranged in more or fewer rows (e.g., 1, 2, 3, 4, 5, 6, or more). In addition, the angle of each row relative to the direction of travel 24 may be selected to control the interaction of the disc blades 34 with the top layer of soil 32. The tillage point assemblies 36 are configured to engage the soil 32 at a greater depth 40, thereby breaking up a lower layer of the soil. Each tillage point assembly 36 includes a tillage point 42 and a shank 44. The shank 44 is configured to position the tillage point 42 at the depth 40 beneath the soil surface 30, and the tillage point 42 is configured to break up the soil. The shape of each tillage point 42, the arrangement of the tillage point assemblies 36, and the number of tillage point assemblies 36 may be selected to control tillage within the field. Furthermore, as the agricultural implement 10 is towed through the field, the finishing discs 38 are driven to rotate, thereby sizing soil clods, leveling the soil surface, smoothing the soil surface, cutting residue on the soil surface, or a combination thereof.

In the illustrated embodiment, the finishing discs 38 are rotatably coupled to a finishing disc frame 45, and the finishing disc frame 45 is pivotally coupled to the implement frame 14. In addition, biasing member(s) 47 extend between the implement frame 14 and the finishing disc frame 45. The biasing member(s) 47 are configured to urge the finishing disc frame 45 toward the surface 30 of the soil 32, thereby driving the finishing discs 38 to engage the soil. While the finishing disc frame is pivotally coupled to the implement frame in the illustrated embodiment, in other embodiments, the finishing disc frame may be movable coupled to the implement frame by a linkage assembly (e.g., four bar linkage assembly, etc.) or another suitable assembly/mechanism that enables the finishing disc frame to move vertically relative to the implement frame. Furthermore, in certain embodiments, the finishing disc frame may be non-translatably and/or non-rotatably coupled to the implement frame, or the finishing disc frame may be omitted, and the finishing discs may be coupled to the implement frame.

While the illustrated agricultural implement includes the disc blades 34, the tillage point assemblies 36, and the finishing discs 38, in other embodiments, the agricultural implement may include other and/or additional ground engaging tool(s). For example, the disc blades, the tillage point assemblies, the finishing discs, or a combination thereof, may be omitted in certain embodiments. Furthermore, in certain embodiments, the agricultural implement may include one or more other suitable ground engaging tools, such as coulter(s), opener(s), and tine(s), among other suitable ground engaging tools. Furthermore, while the agricultural implement 10 is a primary tillage implement in the illustrated embodiment, in other embodiments, the agricultural implement may be a vertical tillage implement, another suitable type of tillage implement, a seeding implement, a planting implement, or another suitable type of implement.

In the illustrated embodiment, the agricultural implement 10 includes an orientation control system 12 configured to control an orientation (e.g., a fore-aft orientation and/or a side-to-side orientation) of the implement frame 14. The orientation control system 12 includes a first sensor 46 coupled to a first portion 48 of the implement frame 14 proximate to the disc blades 34 (e.g., first ground engaging tool). The first sensor 46 is directed toward the surface 30 of the soil 32, and the first sensor 46 is configured to emit a first output signal 50 toward the soil surface 30 and to receive a first return signal indicative of a first height 52 of the first portion 48 of the implement frame 14 above the soil surface 30. In addition, the orientation control system 12 includes a second sensor 54 coupled to a second portion 56 of the implement frame 14 proximate to the tillage point assemblies 36 (e.g., second ground engaging tool). The second sensor 54 is directed toward the surface 30 of the soil 32, and the second sensor 54 is configured to emit a second output signal 58 toward the soil surface 30 and to receive a second return signal indicative of a second height 60 of the second portion 56 of the implement frame 14 above the soil surface 30. As used herein, a sensor coupled to a portion of the implement frame refers to the sensor being coupled to the implement frame (e.g., via any suitable mounting system/assembly) such that the sensor is positioned at the portion of the implement frame.

Furthermore, the orientation control system 12 includes a first actuator 62 coupled to the implement frame 14 and to the hitch frame 18 of the hitch assembly 16. The first actuator 62 is configured to control a position of the hitch 20 of the hitch assembly 16 relative to the implement frame 14 along the vertical axis 25. While the orientation control system 12 includes a single first actuator 62 in the illustrated embodiment, in other embodiments, the orientation control system may include more first actuators extending between the implement frame and the hitch frame. Furthermore, while the first actuator 62 is coupled to the hitch frame 18 in the illustrated embodiment, in other embodiments, the first actuator may be coupled directly to the hitch or another suitable element of the hitch assembly. In addition, the orientation control system 12 includes a second actuator 64 coupled to the implement frame 14 and to the wheel frame of a first wheel assembly 66. The second actuator 64 is configured to control a position of the first wheel assembly 66 relative to the implement frame 14 along the vertical axis 25. While the orientation control system 12 includes a single second actuator 64 in the illustrated embodiment, in other embodiments, the orientation control system may include more second actuators extending between the implement frame and the first wheel assembly. Furthermore, in certain embodiments, the agricultural implement may include a single wheel assembly, and the second actuator may be coupled to the single wheel assembly. In other embodiments, the agricultural implement may include multiple wheel assemblies, and the second actuator may be coupled to the wheel assemblies (e.g., via a linkage assembly). Furthermore, in certain embodiments, the agricultural implement may include multiple wheel assemblies, and at least one second actuator may be coupled to each respective wheel assembly.

As discussed in detail below, the orientation control system 12 includes a controller communicatively coupled to the first sensor 46, to the second sensor 54, to the first actuator 62, and to the second actuator 64. The controller is configured to control the first and second actuators such that the difference between the first height 52 and a first target height (e.g., corresponding to a target penetration depth of corresponding ground engaging tool(s)) is less than a first threshold value (e.g., 1 mm, 2 mm, 3 mm, 5 mm, 10 mm, 15 mm, or 20 mm) and the difference between the second height 60 and a second target height (e.g., corresponding to a target penetration depth of corresponding ground engaging tool(s)) is less than a second threshold value (e.g., 1 mm, 2 mm, 3 mm, 5 mm, 10 mm, 15 mm, or 20 mm). The first target height may be different than the second target height. Accordingly, the controller may control the first and second actuators such that the frame tilts about a lateral axis. As a result, the penetration depth of the disc blades 34 may be adjusted substantially independently of the penetration depth of the tillage point assemblies 36 (e.g., by independently controlling the first height 52 and the second height 60). For example, as the agricultural implement traverses a field, the controller may control the first and second actuators to selectively increase or decrease the penetration depth of the disc blades while substantially maintaining the penetration depth of the tillage point assemblies. In addition, as the agricultural implement traverses the field, the controller may control the first and second actuators to selectively increase or decrease the penetration depth of the tillage point assemblies while substantially maintaining the penetration depth of the disc blades. Accordingly, control of the tillage operation may be enhanced.

In certain embodiments, the illustrated second actuator 64 is configured to move the respective wheel 28 from the illustrated raised position to a lowered position. While the wheels 28 are in the lowered position, the ground engaging tools of the agricultural implement 10 are disengaged from the soil 32 (e.g., to facilitate transport and/or inspection of the agricultural implement 10). The illustrated second actuator 64 may lift the respective wheel 28 from the lowered position to the illustrated raised position (e.g., and other actuators may lift respective wheels from the lowered position to the raised position), thereby causing the ground engaging tools to engage the soil 32. Once the ground engaging tools are engaged with the soil 32, the work vehicle may tow the agricultural implement 10 throughout a field.

While the first sensor is positioned proximate to the disc blades in the illustrated embodiment, in other embodiments, the first sensor may be positioned proximate to other suitable ground engaging tool(s) (e.g., first ground engaging tool(s)). For example, the first sensor may be positioned proximate to one or more coulters, tillage point assemblies, finishing discs, openers, tines, or blades, among other suitable ground engaging tool(s). In addition, while the second sensor is positioned proximate to the tillage point assemblies in the illustrated embodiment, in other embodiments, the second sensor may be positioned proximate to other suitable ground engaging tool(s) (e.g., second ground engaging tool(s)). For example, the second sensor may be positioned proximate to one or more coulters, disc blades, finishing discs, openers, tines, or blades, among other suitable ground engaging tool(s).

In certain embodiments, a single sensor (e.g., the first sensor 46) may be positioned at (e.g., coupled to) any suitable location on the implement frame 14 (e.g., the longitudinal center of the implement frame). In such embodiments, the controller may be configured to control the first and second actuators (e.g., only based on feedback from the single sensor), such that a difference between the implement frame height (e.g., height of the implement frame above the soil surface) and a target height (e.g., corresponding to a target penetration depth of the ground engaging tools) is less than a threshold value (e.g., 1 mm, 2 mm, 3 mm, 5 mm, 10 mm, 15 mm, or 20 mm). Accordingly, at least a portion of the ground engaging tools (e.g., all of the ground engaging tools) on the implement frame may be substantially maintained at a target penetration depth beneath the soil surface, thereby enhancing the effectiveness of the agricultural operation. The single sensor may be the only sensor of the agricultural implement configured to provide feedback indicative of the implement frame height. Due to the reduced number of sensors, the cost of the orientation control system may be reduced, as compared to the embodiments disclosed above with multiple sensors. In certain embodiments, the hitch assembly may be coupled to the wheel assemblies by a mechanical linkage. In such embodiments, a single actuator (e.g., the first actuator) may control both the position of the hitch and the position of the wheel assemblies along the vertical axis. Accordingly, the single actuator (e.g., first actuator) may control the implement frame height, thereby further reducing the cost of the orientation control system. Furthermore, in certain embodiments, the first actuator may be omitted, and the hitch frame may freely move (e.g., rotate) relative to the implement frame. In such embodiments, the agricultural implement may include one or more forward wheel assemblies (e.g., one or more gauge wheel assemblies), and an actuator may extend from the implement frame to each respective forward wheel assembly. The controller may control each wheel actuator to control the height of the implement frame above the soil surface.

Figure 2:
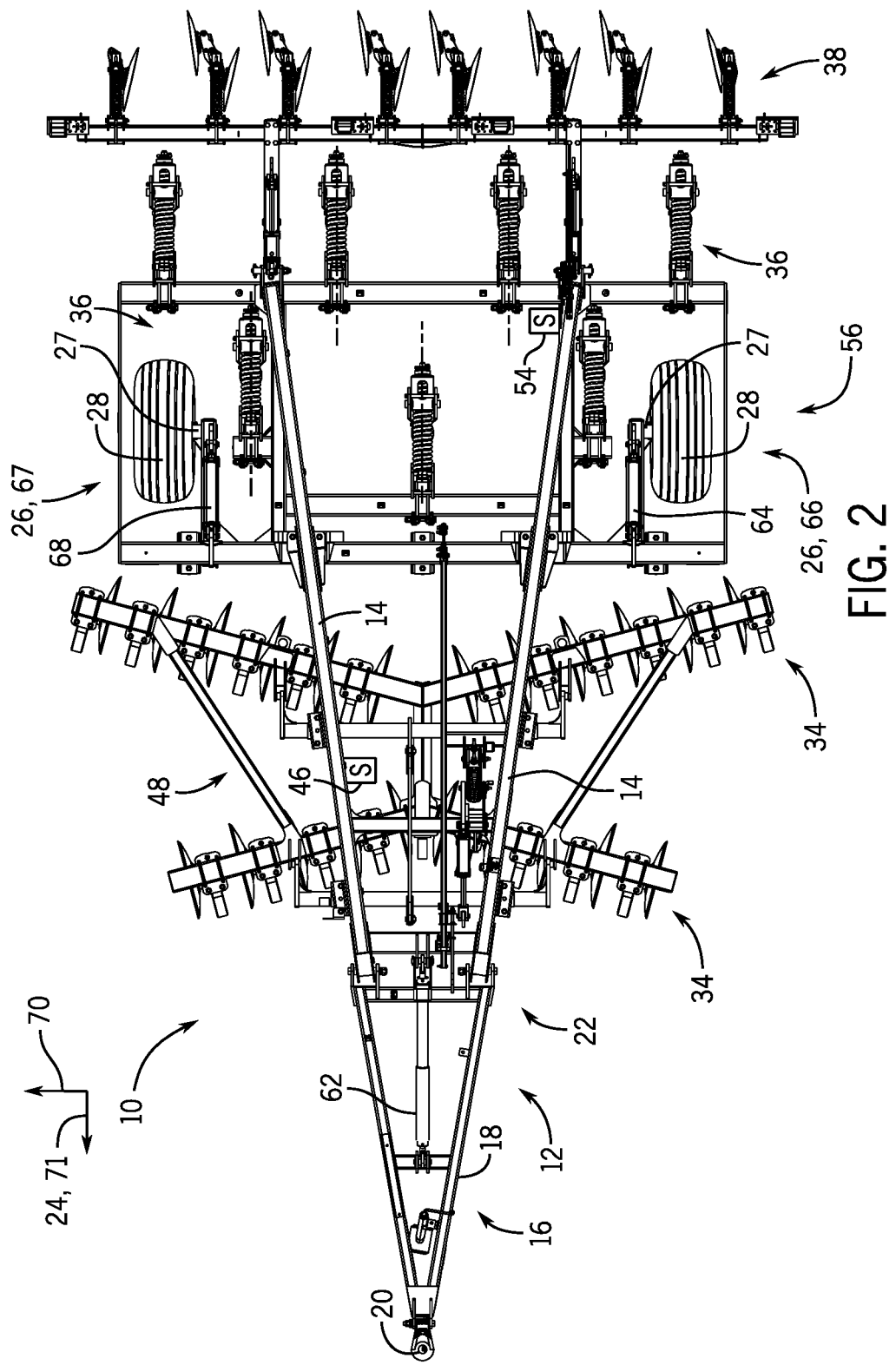
FIG. 2 is a top view of the agricultural implement of FIG. 1.

FIG. 2 is a top view of the agricultural implement 10 of FIG. 1. As previously discussed, each wheel assembly 26 includes a wheel frame 27 and a wheel 28 rotatably coupled to the wheel frame. In the illustrated embodiment, each wheel frame 27 is pivotally coupled to the implement frame 14, thereby facilitating adjustment of the position of each wheel 28 along the vertical axis. However, in other embodiments, at least one wheel frame may be movably coupled to the implement frame by another suitable connection (e.g., sliding connection, linkage assembly, etc.) that facilitates adjustment of the vertical position of the respective wheel(s). Furthermore, while the agricultural implement 10 includes two wheel assemblies 26 in the illustrated embodiment, in other embodiments, the agricultural implement may include more or fewer wheel assemblies (e.g., 1, 2, 3, 4, 5, 6, or more). In addition, each wheel assembly may include any suitable number of wheels (e.g., 1, 2, 3, 4, 5, 6, or more).

As previously discussed, the first sensor 46 is configured to emit a first output signal toward the soil surface and to receive a first return signal indicative of a first height of the first portion 48 of the implement frame 14 above the soil surface. In addition, the second sensor 54 is configured to emit a second output signal toward the soil surface and to receive a second return signal indicative of a second height of the second portion 56 of the implement frame 14 above the soil surface. Furthermore, as illustrated, the first actuator 62 is coupled to the implement frame 14 and to the hitch frame 18 of the hitch assembly 16, and the first actuator 62 is configured to control a position of the hitch 20 of the hitch assembly 16 relative to the implement frame 14 along the vertical axis. In addition, the second actuator 64 is coupled to the implement frame 14 and to the wheel frame 27 of the first wheel assembly 66, and the second actuator 64 is configured to control a position of the first wheel assembly 66 relative to the implement frame along the vertical axis.

In certain embodiments, the first portion 48 is positioned forward of the second portion 56 relative to the direction of travel 24 of the agricultural implement 10. In such embodiments, another second actuator may be coupled to the implement frame 14 and to a second wheel assembly 67, and the other second actuator may be configured to control a position of the second wheel assembly 67 relative to the implement frame along the vertical axis. In addition, the controller is configured to control the first and second actuators to tilt the implement frame 14 about a lateral axis 70 such that a difference between the first height and the first target height is less than a first threshold value, and a difference between the second height and the second target height is less than a second threshold value. In certain embodiments, the first target height is different than the second target height. Accordingly, the penetration depth of the disc blades 34 may be adjusted substantially independently of the penetration depth of the tillage point assemblies 36 (e.g., by independently controlling the first height and the second height). As a result, control of the tillage operation may be enhanced. While the illustrated embodiment includes two wheel assemblies, in other embodiments, the agricultural implement may include more or fewer wheels assemblies (e.g., 1, 2, 3, 4, 5, 6, or more). In addition, while the embodiment described above includes one second actuator for each wheel assembly, in other embodiments, the orientation control system may include more or fewer second actuators for each wheel assembly. For example, in certain embodiments, multiple second actuators may be coupled to at least one wheel assembly, and/or a single second actuator may be coupled to multiple wheel assemblies.

In the illustrated embodiment, the orientation control system 12 includes a third actuator 68 coupled to the frame 14 of the agricultural implement 10 and to the second wheel assembly 67 (e.g., to the wheel frame 27 of the second wheel assembly 67). The third actuator 68 is communicatively coupled to the controller and configured to control a position of the second wheel assembly 67 relative to the frame 14 along the vertical axis, thereby controlling the position of the respective wheel 28 relative to the frame 14. In certain embodiments, the first portion is laterally offset from the second portion relative to the direction of travel 24 of the agricultural implement (e.g., the first portion is offset from the second portion along the lateral axis 70). In such embodiments, the controller is configured to control the first, second, and third actuators to tilt the frame 14 about a longitudinal axis 71 (e.g., extending along the direction of travel 24) such that the difference between the first height and the first target height is less than the first threshold value, and the difference between the second height and the second target height is less than the second threshold value. In certain embodiments, the first target height is different than the second target height. Accordingly, the penetration depth of the ground engaging tools (e.g., disc blades 34, tillage point assemblies 36, etc.) on the left side of the agricultural implement 10 may be adjusted substantially independently of the penetration depth of the ground engaging tools (e.g., disc blades 34, tillage point assemblies 36, etc.) on the right side of the agricultural implement (e.g., by independently controlling the first height and the second height). As a result, control of the tillage operation may be enhanced. While the illustrated embodiment includes two wheel assemblies, in other embodiments, the agricultural implement may include more or fewer wheels assemblies (e.g., 1, 2, 3, 4, 5, 6, or more). In addition, while the embodiment described above includes one second/third actuator for each wheel assembly, in other embodiments, the orientation control system may include more second/third actuators for each wheel assembly.

In certain embodiments, the hitch assembly may be coupled to the wheel assemblies by a mechanical linkage. In such embodiments, the first actuator may control both the position of the hitch and the position of the wheel assemblies along the vertical axis. In addition, the second actuators, or the second and third actuators, may extend from the mechanical linkage to the respective wheel assemblies. Accordingly, the controller is configured to control the first and second/third actuators to control the first and second heights of the implement frame. Furthermore, in certain embodiments, the first actuator may be omitted, and the hitch frame may freely move (e.g., rotate) relative to the implement frame. In such embodiments, the agricultural implement may include one or more forward wheel assemblies (e.g., one or more gauge wheel assemblies), and an actuator may extend from the implement frame to each respective forward wheel assembly. The controller may control each wheel actuator to control the first and second heights of the implement frame.

Figure 3:
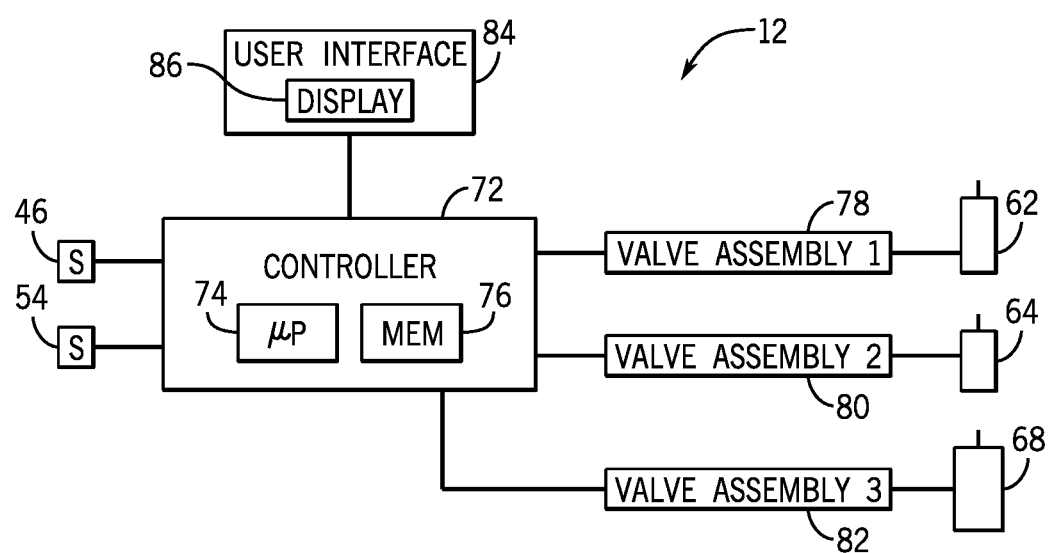
FIG. 3 is a schematic view of an embodiment of an orientation control system that may be employed within the agricultural implement of FIG. 1.

FIG. 3 is a schematic view of an embodiment of an orientation control system 12 that may be employed within the agricultural implement of FIG. 1. In the illustrated embodiment, the orientation control system 12 includes a controller 72 communicatively coupled to the first sensor 46, to the second sensor 54, to the first actuator 62, to the second actuator 64, and to the third actuator 68. The controller 72 is configured to control the first, second, and third actuators such that the difference between the first height and the first target height is less than the first threshold value and the difference between the second height and the second target height is less than the second threshold value. In the illustrated embodiment, the controller 72 is an element of the orientation control system 12 and may be located in/on the agricultural implement. However, in other embodiments, the controller may be located in/on a work vehicle coupled to the agricultural implement. Furthermore, in certain embodiments, one or more functions of the controller may be distributed across multiple control devices (e.g., the control devices forming the controller).

In certain embodiments, the controller 72 is an electronic controller having electrical circuitry configured to control the first, second, and third actuators. In the illustrated embodiment, the controller 72 includes a processor, such as the illustrated microprocessor 74, and a memory device 76. The controller 72 may also include one or more storage devices and/or other suitable components. The processor 74 may be used to execute software, such as software for controlling the first, second, and third actuators, and so forth. Moreover, the processor 74 may include multiple microprocessors, one or more "general-purpose" microprocessors, one or more special-purpose microprocessors, and/or one or more application specific integrated circuits (ASICS), or some combination thereof. For example, the processor 74 may include one or more reduced instruction set (RISC) processors.

The memory device 76 may include a volatile memory, such as random access memory (RAM), and/or a nonvolatile memory, such as read-only memory (ROM). The memory device 76 may store a variety of information and may be used for various purposes. For example, the memory device 76 may store processor-executable instructions (e.g., firmware or software) for the processor 74 to execute, such as instructions for controlling the first, second, and third actuators, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the first, second, and third actuators, etc.), and any other suitable data.

As previously discussed, the first sensor 46 is configured to emit a first output signal toward the soil surface and to receive a first return signal indicative of the first height of the first portion of the implement frame above the soil surface. In addition, the second sensor 54 is configured to emit a second output signal toward the soil surface and to receive a second return signal indicative of the second height of the second portion of the implement frame above the soil surface. The first sensor 46 and the second sensor 54 may include any suitable type of sensor configured to emit an output signal toward the soil surface and to receive a return signal indicative of a distance between the sensor and the soil surface. In certain embodiments, the first sensor and/or the second sensor may include an infrared sensor configured to emit an infrared signal toward the soil surface and to receive a return infrared signal from the soil surface. Furthermore, in certain embodiments, the first sensor and/or the second sensor may include a radio detection and ranging (RADAR) sensor (e.g., millimeter wave (MMW) scanner, etc.) configured to emit a radio frequency signal toward the soil surface and to receive a return radio frequency signal from the soil surface. In addition, in certain embodiments, the first sensor and/or the second sensor may include a lidar sensor (e.g., time-of-flight scanning laser, etc.) configured to emit a light signal toward the soil surface and to receive a return light signal from the soil surface. By way of further example, in certain embodiments, the first sensor and/or the second sensor may include an ultrasonic sensor configured to emit an ultrasonic signal toward the soil surface and to receive a return ultrasonic signal from the soil surface. Furthermore, in certain embodiments, the first sensor and/or the second sensor may include a capacitive sensor configured to emit an electric signal/field toward the soil surface and to receive a return electric signal from the soil surface (e.g., in the form of a change to the emitted electric signal/field). While the first sensor and the second sensor are non-contact sensors (e.g., configured to emit an output signal and to receive a return signal) in the illustrated embodiment, in other embodiments, the first sensor and/or the second sensor may be contact sensor(s) (e.g., including a ground contact element) configured to monitor the height of the respective portion(s) of the frame above the soil surface.

In the illustrated embodiment, the first actuator 62 includes a hydraulic cylinder configured to control the position of the hitch of the hitch assembly relative to the implement frame along the vertical axis. In addition, the orientation control system 12 includes a first valve assembly 78 configured to control a flow of fluid (e.g., hydraulic fluid) to the first actuator 62/hydraulic cylinder. Accordingly, the controller 72 is communicatively coupled to the first actuator 62 via the first valve assembly 78. The first valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the first actuator 62/hydraulic cylinder (e.g., from a fluid source) and, in certain embodiments, from the first actuator 62/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the first actuator 62 includes a single hydraulic cylinder in the illustrated embodiment, in other embodiments, the first actuator may include multiple hydraulic cylinders (e.g., 2, 3, 4, 5, 6, etc.). Furthermore, in certain embodiments, the first actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

In the illustrated embodiment, the second actuator 64 includes a hydraulic cylinder configured to control the position of the respective wheel assembly relative to the implement frame along the vertical axis. In addition, the orientation control system 12 includes a second valve assembly 80 configured to control a flow of fluid (e.g., hydraulic fluid) to the second actuator 64/hydraulic cylinder. Accordingly, the controller 72 is communicatively coupled to the second actuator 64 via the second valve assembly 80. The second valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the second actuator 64/hydraulic cylinder (e.g., from a fluid source) and, in certain embodiments, from the second actuator 64/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the second actuator 64 includes a single hydraulic cylinder in the illustrated embodiment, in other embodiments, the second actuator may include multiple hydraulic cylinders (e.g., 2, 3, 4, 5, 6, etc.). Furthermore, in certain embodiments, the second actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

In the illustrated embodiment, the third actuator 68 includes a hydraulic cylinder configured to control the position of the respective wheel assembly relative to the implement frame along the vertical axis. In addition, the orientation control system 12 includes a third valve assembly 82 configured to control a flow of fluid (e.g., hydraulic fluid) to the third actuator 68/hydraulic cylinder. Accordingly, the controller 72 is communicatively coupled to the third actuator 68 via the third valve assembly 82. The third valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the third actuator 68/hydraulic cylinder (e.g., from a fluid source) and, in certain embodiments, from the third actuator 68/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the third actuator 68 includes a single hydraulic cylinder in the illustrated embodiment, in other embodiments, the third actuator may include multiple hydraulic cylinders (e.g., 2, 3, 4, 5, 6, etc.). Furthermore, in certain embodiments, the third actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

In certain embodiments (e.g., embodiments in which a second actuator is coupled to each wheel assembly of the implement frame), the controller 72 is configured to control the first and second actuators such that a difference between the first height and a first target height is less than a first threshold value and a difference between the second height and a second target height is less than a second threshold value. The first target height may be different than the second target height. Accordingly, the controller 72 may control the first and second actuators such that the frame tilts about the lateral axis. As a result, the penetration depth of the forward ground engaging tools may be adjusted substantially independently of the penetration depth of the rearward ground engaging tools. In addition, in certain embodiments (e.g., embodiments in which the second actuator is coupled to the first wheel assembly, and the third actuator is coupled to the second wheel assembly), the control 72 may control the first, second, and third actuators such that the difference between the first height and the first target height is less than the first threshold value and the difference between the second height and the second target height is less the second threshold value. Accordingly, the controller 74 may control the first, second, and third actuators such that the frame tilts about the longitudinal axis. As a result, the penetration depth of left ground engaging tools may be adjusted substantially independently of right ground engaging tools. Additionally or alternatively, the controller 72 may control the first, second, and third actuators such that the frame tilts about the lateral axis. Accordingly, control of the tillage operation may be enhanced.

In the illustrated embodiment, the orientation control system 12 includes a user interface 84 communicatively coupled to the controller 72. The user interface 84 may include any suitable control(s) configured to enable an operator to interact with (e.g., provide input to, etc.) the orientation control system 12, such as a keyboard, a mouse, one or more switches, one or more buttons, and one or more knobs. For example, the operator may input the first target height, the second target height, the first threshold value, the second threshold value, other suitable parameters, or a combination thereof, into the user interface. The user interface, in turn, may output signal(s) to the controller indicative of the input values. In the illustrated embodiment, the user interface includes a display 86 configured to present information to the operator. For example, the display 86 may present the first height of the first portion of the implement frame above the soil surface, the second height of the second portion of the implement frame above the soil surface, a difference between the first height and the second height, the first threshold value, the second threshold value, other suitable parameters, or a combination thereof. In addition, in certain embodiments, the display may include a touchscreen interface configured to enable an operator to provide input to the controller via the display.

Figure 4:
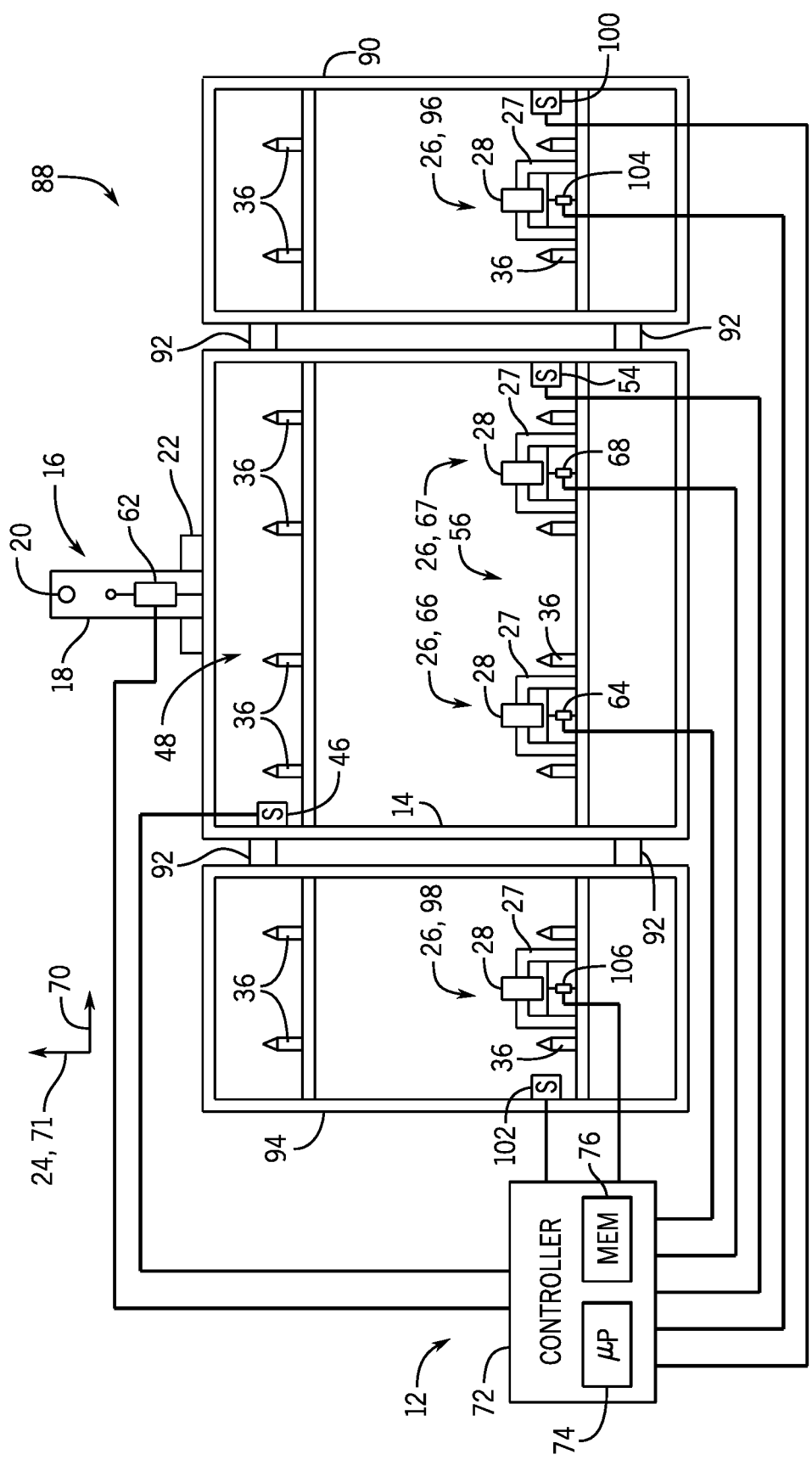
FIG. 4 is a top view of another embodiment of an agricultural implement having wing frames rotatably coupled to a main frame.

FIG. 4 is a top view of another embodiment of an agricultural implement 88 having wing frames rotatably coupled to a main frame 14. In the illustrated embodiment, the main frame 14 (e.g., implement frame) is configured to support a first group of ground engaging tools, such as the illustrated tillage point assemblies 36. While the main frame 14 supports two rows of tillage point assemblies 36 in the illustrated embodiment, in other embodiments, the main frame 14 may support more or fewer rows of tillage point assemblies (e.g., 1, 2, 3, 4, 5, 6, 7, 8, or more). Furthermore, while the main frame 14 includes tillage point assemblies 36 in the illustrated embodiment, in other embodiments, the main frame may support other suitable ground engaging tools, such as disc blades and finishing discs, among other suitable ground engaging tools.

In the illustrated embodiment, the agricultural implement 88 includes a first wing frame 90 pivotally coupled to the main frame 14 by one or more pivot joints 92. The pivot joints 92 enable the first wing frame 90 to pivot about the longitudinal axis 71 relative to the main frame 14, thereby enabling the first wing frame 90 to follow contours of the soil surface. Furthermore, the agricultural implement 88 includes a second wing frame 94 pivotally coupled to the main frame 14 by one or more pivot joints 92. The second wing frame 94 is positioned on the opposite lateral side of the main frame 14 from the first wing frame. The pivot joints 92 enable the second wing frame 94 to pivot about the longitudinal axis 71 relative to the main frame 14, thereby enabling the second wing frame 94 to follow contours of the soil surface. Furthermore, the first wing frame 90 supports a second group of ground engaging tools, such as the illustrated tillage point assemblies 36, and the second wing frame 94 supports a third group of ground engaging tools, such as the illustrated tillage point assemblies 36. Each wing frame may support the same type(s) of ground engaging tools as the main frame, or at least one wing frame may support different type(s) of ground engaging tools from the main frame. While the agricultural implement has two wing frames in the illustrated embodiment, in other embodiments, the agricultural implement may include more or fewer wing frames. For example, the agricultural implement may include a single wing frame positioned on one lateral side of the main frame. In addition, the agricultural implement may include multiple wing frames on at least one lateral side of the main frame (e.g., in which at least two of the wing frames are pivotally coupled to one another by respective pivot joint(s)).

In the illustrated embodiment, the first wheel assembly 66 and the second wheel assembly 67 are movably coupled to the main frame 14. In addition, a third wheel assembly 96 is movably coupled to the first wing frame 90, and a fourth wheel assembly 98 is movably coupled to the second wing frame 94. Each wheel assembly 26 includes a wheel frame 27 and a wheel 28 rotatably coupled to the wheel frame. In the illustrated embodiment, each wheel frame 27 is pivotally coupled to the respective frame (e.g., main frame or wing frame), thereby facilitating adjustment of the position of each wheel 28 along the vertical axis. However, in other embodiments, at least one wheel frame may be movably coupled to the respective frame (e.g., main frame or wing frame) by another suitable connection (e.g., sliding connection, linkage assembly, etc.) that facilitates adjustment of the vertical position of the respective wheel(s). Furthermore, while two wheel assemblies 26 are coupled to the main frame 14 in the illustrated embodiment, in other embodiments, more or fewer wheel assemblies (e.g., 1, 2, 3, 4, 5, 6, or more) may be coupled to the main frame. While one wheel assembly 26 is coupled to each wing frame in the illustrated embodiment, in other embodiments, additional wheel assemblies (e.g., 1, 2, 3, 4, 5, 6, or more) may be coupled to at least one wing frame. In addition, each wheel assembly may include any suitable number of wheels (e.g., 1, 2, 3, 4, 5, 6, or more).

As illustrated, the hitch assembly 16 is movably coupled to the main frame 14, and the hitch 20 of the hitch assembly 16 is configured to engaging a corresponding hitch of a work vehicle (e.g., tractor), which is configured to tow the agricultural implement 88 through a field along the direction of travel 24. The hitch frame 18 of the hitch assembly 16 is pivotally coupled to the main frame 14 via pivot joint(s) 22. However, in other embodiments, the hitch frame may be movably coupled to the main frame by a linkage assembly (e.g., four bar linkage assembly, etc.) or another suitable assembly/mechanism that enables the hitch to move along the vertical axis relative to the main frame.

In the illustrated embodiment, the orientation control system 12 includes the first sensor 46 coupled to the first portion 48 of the main frame 14 proximate to a first ground engaging tool (e.g., tillage point assembly 36) of the first group of ground engaging tools. As previously discussed, the first sensor 46 is configured to emit the first output signal toward the soil surface and to receive the first return signal indicative of the first height of the first portion 48 of the main frame 14 above the soil surface. In addition, the orientation control system 12 includes the second sensor 54 coupled to the second portion 56 of the main frame 14 proximate to a second ground engaging tool (e.g., tillage point assembly 36) of the first group of ground engaging tools. As previously discussed, the second sensor 54 is configured to emit the second output signal toward the soil surface and to receive the second return signal indicative of the second height of the second portion 56 of the main frame 14 above the soil surface.

Furthermore, the orientation control system 12 includes the first actuator 62 coupled to the main frame 14 and to the hitch assembly 16. The first actuator 62 is configured to control the position of the hitch 20 of the hitch assembly 16 relative to the main frame 14 along the vertical axis. The orientation control system 12 also includes the second actuator 64 coupled to the main frame 14 and to the first wheel assembly 66. The second actuator 64 is configured to control the position of the first wheel assembly 66 relative to the main frame 14 along the vertical axis. In the illustrated embodiment, the orientation control system 12 includes the third actuator 68 coupled to the main frame 14 and to the second wheel assembly 67. The third actuator 68 is configured to control the position of the second wheel assembly 67 relative to the main frame 14 along the vertical axis.

In the illustrated embodiment, the controller 72 is communicatively coupled to the first sensor 46, to the second sensor 54, to the first actuator 62 (e.g., via the first valve assembly), to the second actuator 64 (e.g., via the second valve assembly), and to the third actuator 68 (e.g., via the third valve assembly). Similar to the embodiment described above with reference to FIGS. 1-3, the controller 72 is configured to control the first, second, and third actuators such that a difference between the first height and a first target height is less than a first threshold value and a difference between the second height and a second target height is less than a second threshold value. In certain embodiments, the first target height is different than the second target height. Accordingly, the penetration depth of the ground engaging tools (e.g., tillage point assemblies 36, etc.) at the first portion 48 of the main frame 14 may be adjusted substantially independently of the penetration depth of the ground engaging tools (e.g., tillage point assemblies 36, etc.) at the second portion of the main frame (e.g., by independently controlling the first height and the second height). As a result, control of the tillage operation may be enhanced. The illustrated agricultural implement/orientation control system may include any of the variations disclosed above with reference to the embodiment of FIGS. 1-3. For example, the first and second portions may be located at opposite lateral sides of the main frame, the first and second portions may be located at opposite longitudinal sides of the main frame, a second actuator may be coupled to the second wheel assembly, the hitch assembly may be coupled to the wheel assemblies by a mechanical linkage, etc.

In the illustrated embodiment, the orientation control system 12 includes a third sensor 100 coupled to the first wing frame 90 proximate to a ground engaging tool (e.g., tillage point assembly 36) of the second group of ground engaging tools. The third sensor 100 is communicatively coupled to the controller 72 and directed toward the soil surface. In addition, the third sensor 100 is configured to emit a third output signal toward the soil surface and to receive a third return signal indicative of a third height of the first wing frame 90 above the soil surface. Furthermore, the orientation control system 12 includes a fourth sensor 102 coupled to the second wing frame 94 proximate to a ground engaging tool (e.g., tillage point assembly 36) of the third group of ground engaging tools. The fourth sensor 102 is communicatively coupled to the controller 72 and directed toward the soil surface. In addition, the fourth sensor 102 is configured to emit a fourth output signal toward the soil surface and to receive a fourth return signal indicative of a fourth height of the second wing frame 94 above the soil surface. The third sensor and the fourth sensor may include any suitable type of sensor, such as the sensors described above with reference to the first sensor and the second sensor. Furthermore, in embodiments having more or fewer wing frames, the orientation control system may include one sensor for each wing frame.

In the illustrated embodiment, the orientation control system 12 includes a fourth actuator 104 coupled to the first wing frame 90 and to the wheel frame 27 of the third wheel assembly 96. The fourth actuator 104 is configured to control a position of the third wheel assembly 96 relative to the first wing frame 90 along the vertical axis. While the orientation control system 12 includes a single fourth actuator 104 in the illustrated embodiment, in other embodiments, the orientation control system may include more fourth actuators extending between the first wing frame and the third wheel assembly. Furthermore, in embodiments in which multiple wheel assemblies are coupled to the first wing frame, the orientation control system may include at least one fourth actuator for each wheel assembly, or the orientation control system may include a fourth actuator coupled to multiple wheel assemblies by a linkage. In addition, the orientation control system 12 includes a fifth actuator 106 coupled to the second wing frame 94 and to the wheel frame 27 of the fourth wheel assembly 98. The fifth actuator 106 is configured to control a position of the fourth wheel assembly 98 relative to the second wing frame 94 along the vertical axis. While the orientation control system 12 includes a single fifth actuator 106 in the illustrated embodiment, in other embodiments, the orientation control system may include more fifth actuators extending between the second wing frame and the fourth wheel assembly. Furthermore, in embodiments in which multiple wheel assemblies are coupled to the second wing frame, the orientation control system may include at least one fifth actuator for each wheel assembly, or the orientation control system may include a fifth actuator coupled to multiple wheel assemblies by a linkage. In the illustrated embodiment, the fourth and fifth actuators are communicatively coupled to the controller 72 (e.g., via respective valve assemblies, such as the valve assemblies described above with reference to FIG. 3).

In certain embodiments (e.g., embodiments in which a second actuator is coupled to each wheel assembly of the main frame, and the first and second portions are located at opposite longitudinal sides of the main frame), the controller is configured to control the first actuator 62, the second actuator(s) 64, and the fourth actuator 104 such that a difference between the first height and a first target height is less than a first threshold value (e.g., 1 mm, 2 mm, 3 mm, 5 mm, 10 mm, 15 mm, or 20 mm), a difference between the second height and a second target height is less than a second threshold value (e.g., 1 mm, 2 mm, 3 mm, 5 mm, 10 mm, 15 mm, or 20 mm), and a difference between the third height and a third target height (e.g., corresponding to a target penetration depth of corresponding ground engaging tool(s)) is less than a third threshold value (e.g., 1 mm, 2 mm, 3 mm, 5 mm, 10 mm, 15 mm, or 20 mm). The first target height may be different than the second target height, the first target height may be different than the third target height, the second target height may be different than the third target height, or a combination thereof. Accordingly, the controller may control the first, second, and fourth actuators such that the main frame tilts about the lateral axis 70, and/or such that the height of the first wing frame is different than the height of a portion of the main frame. As a result, the penetration depth of forward tillage point assemblies 36 of the first group may be adjusted substantially independently of the penetration depth of rearward tillage point assemblies 36 of the first group (e.g., by independently controlling the first height and the second height), and/or the penetration depth of the second group of tillage point assemblies 36 may be adjusted substantially independently of the penetration depth of the first group of tillage point assemblies 36 (e.g., by independently controlling the third height and the first/second height). Accordingly, control of the tillage operation may be enhanced.

In certain embodiments (e.g., embodiments in which the second actuator is coupled to the first wheel assembly, the third actuator is coupled to the second wheel assembly, and the first portion is laterally offset from the second portion relative to the direction of travel 24 of the agricultural implement), the controller is configured to control the first actuator 62, the second actuator 64, the third actuator 68, and the fourth actuator 104 such that a difference between the first height and a first target height is less than a first threshold value (e.g., 1 mm, 2 mm, 3 mm, 5 mm, 10 mm, 15 mm, or 20 mm), a difference between the second height and a second target height is less than a second threshold value (e.g., 1 mm, 2 mm, 3 mm, 5 mm, 10 mm, 15 mm, or 20 mm), and a difference between the third height and a third target height is less than a third threshold value (e.g., 1 mm, 2 mm, 3 mm, 5 mm, 10 mm, 15 mm, or 20 mm). The first target height may be different than the second target height, the first target height may be different than the third target height, the second target height may be different than the third target height, or a combination thereof. Accordingly, the controller may control the first, second, third, and fourth actuators such that the main frame tilts about the longitudinal axis 71, and/or such that the height of the first wing frame is different than the height of a portion of the main frame. As a result, the penetration depth of the tillage point assemblies 36 of the first group on the left side of the main frame 14 may be adjusted substantially independently of the penetration depth of the tillage point assemblies 36 of the first group on the right side of the main frame 14 (e.g., by independently controlling the first height and the second height), and/or the penetration depth of the second group of tillage point assemblies 36 may be adjusted substantially independently of the penetration depth of the first group of tillage point assemblies 36 (e.g., by independently controlling the third height and the first/second height). Accordingly, control of the tillage operation may be enhanced.

Furthermore, in certain embodiments, the controller is configured to control the first actuator 62, the second actuator 64, the third actuator 68, the fourth actuator 104, and the fifth actuator 106, such that a difference between the first height and a first target height is less than a first threshold value, a difference between the second height and a second target height is less than a second threshold value, a difference between the third height and a third target height is less than a third threshold value, and a difference between the fourth height and a fourth target height (e.g., corresponding to a target penetration depth of corresponding ground engaging tool(s)) is less than a fourth threshold value (e.g., 1 mm, 2 mm, 3 mm, 5 mm, 10 mm, 15 mm, or 20 mm). The fourth target height may be different than the first target height, the second target height, the third target height, or a combination thereof. Accordingly, the controller may control the fifth actuator such that the height of the second wing frame is different than the height of a portion of the main frame and/or the height of the first wing frame. As a result, the penetration depth of the tillage point assemblies 36 of the third group may be adjusted substantially independently of the penetration depth of the tillage point assemblies 36 of the first group and/or the tillage point assemblies 36 of the second group. Accordingly, control of the tillage operation may be enhanced.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f).

However, for any claims containing elements designated in any other manner, it is intended that such elements are not to be interpreted under 35 U.S.C. 112(f).

The invention claimed is:

1. An orientation control system for an agricultural implement, comprising:
    a first sensor configured to be positioned at a first portion of a frame of the agricultural implement proximate to a first ground engaging tool, wherein the first sensor is configured to be directed toward a soil surface, and the first sensor is configured to emit a first output signal toward the soil surface and to receive a first return signal indicative of a first height of the first portion of the frame above the soil surface;
    a second sensor configured to be positioned at a second portion of the frame proximate to a second ground engaging tool, wherein the first portion is laterally offset from the second portion relative to a direction of travel of the agricultural implement, the second sensor is configured to be directed toward the soil surface, and the second sensor is configured to emit a second output signal toward the soil surface and to receive a second return signal indicative of a second height of the second portion of the frame above the soil surface;
    a first actuator configured to be coupled to a hitch assembly of the agricultural implement, wherein the first actuator is configured to control a vertical position of a hitch of the hitch assembly relative to the frame;
    a second actuator configured to be coupled to a first wheel assembly of the agricultural implement, wherein the second actuator is configured to control a vertical position of the first wheel assembly relative to the frame;
    a third actuator configured to be coupled to a second wheel assembly of the agricultural implement, wherein the third actuator is configured to control a vertical position of the second wheel assembly relative to the frame; and
    a controller comprising a memory and a processor, wherein the controller is communicatively coupled to the first sensor, to the second sensor, to the first actuator, to the second actuator, and to the third actuator, the controller is configured to control the first, second, and third actuators to tilt the frame about a longitudinal axis such that a difference between the first height and a first target height is less than a first threshold value and a difference between the second height and a second target height is less than a second threshold value, and the first target height is different than the second target height.

2. The orientation control system of claim 1, wherein the first sensor comprises an infrared sensor, a radio detection and ranging sensor, a lidar sensor, an ultrasonic sensor, or a capacitive sensor; and
    wherein the second sensor comprises an infrared sensor, a radio detection and ranging sensor, a lidar sensor, an ultrasonic sensor, or a capacitive sensor.

3. The orientation control system of claim 1, wherein the first actuator comprises a first hydraulic cylinder, and the second actuator comprises a second hydraulic cylinder.

4. The orientation control system of claim 3, comprising:
    a first valve assembly configured to control a flow of fluid to the first actuator, wherein the controller is communicatively coupled to the first actuator via the first valve assembly; and
    a second valve assembly configured to control a flow of fluid to the second actuator, wherein the controller is communicatively coupled to the second actuator via the second valve assembly.

5. An agricultural implement, comprising:
    a main frame configured to support a first plurality of ground engaging tools;
    a first wing frame pivotally coupled to the main frame, wherein the first wing frame is configured to support a second plurality of ground engaging tools;
    a first wheel assembly movably coupled to the main frame;
    a second wheel assembly movably coupled to the first wing frame;
    a third wheel assembly movably coupled to the main frame;
    a hitch assembly movably coupled to the main frame, wherein the hitch assembly comprises a hitch configured to engage a corresponding hitch of a work vehicle;
    an orientation control system, comprising:
        a first sensor coupled to a first portion of the main frame proximate to a first ground engaging tool of the first plurality of ground engaging tools, wherein the first sensor is directed toward a soil surface, and the first sensor is configured to emit a first output signal toward the soil surface and to receive a first return signal indicative of a first height of the first portion of the main frame above the soil surface;
        a second sensor coupled to a second portion of the main frame proximate to a second ground engaging tool of the first plurality of ground engaging tools, wherein the first portion is laterally offset from the second portion relative to a direction of travel of the agricultural implement, the second sensor is directed toward the soil surface, and the second sensor is configured to emit a second output signal toward the soil surface and to receive a second return signal indicative of a second height of the second portion of the main frame above the soil surface;
        a third sensor coupled to the first wing frame proximate to a ground engaging tool of the second plurality of ground engaging tools, wherein the third sensor is directed toward the soil surface, and the third sensor is configured to emit a third output signal toward the soil surface and to receive a third return signal indicative of a third height of the first wing frame above the soil surface;
        a first actuator coupled to the hitch assembly, wherein the first actuator is configured to control a vertical position of the hitch of the hitch assembly relative to the main frame;
        a second actuator coupled to the first wheel assembly, wherein the second actuator is configured to control a vertical position of the first wheel assembly relative to the main frame;
        a third actuator coupled to the second wheel assembly, wherein the third actuator is configured to control a vertical position of the second wheel assembly relative to the first wing frame;
        a fourth actuator coupled to the third wheel assembly, wherein the fourth actuator is configured to control a vertical position of the third wheel assembly relative to the main frame; and
        a controller comprising a memory and a processor, wherein the controller is communicatively coupled to the first sensor, to the second sensor, to the third sensor, to the first actuator, to the second actuator, to the third actuator, and to the fourth actuator, and the controller is configured to control the first, second, third, and fourth actuators such that a difference between the first height and a first target height is less than a first threshold value, a difference between the second height and a second target height is less than a second threshold value, and a difference between the third height and a third target height is less than a third threshold value;

wherein the first target height is different than the second target height; and wherein the controller is configured to control the first, second, and fourth actuators to tilt the frame about a longitudinal axis such that the difference between the first height and the first target height is less than the first threshold value and the difference between the second height and the second target height is less than the second threshold value.

6. The agricultural implement of claim 5, wherein the first sensor comprises an infrared sensor, a radio detection and ranging sensor, a lidar sensor, an ultrasonic sensor, or a capacitive sensor;

wherein the second sensor comprises an infrared sensor, a radio detection and ranging sensor, a lidar sensor, an ultrasonic sensor, or a capacitive sensor; and wherein the third sensor comprises an infrared sensor, a radio detection and ranging sensor, a lidar sensor, an ultrasonic sensor, or a capacitive sensor.

7. The agricultural implement of claim 5, wherein the first actuator comprises a first hydraulic cylinder, and the second actuator comprises a second hydraulic cylinder.

8. The agricultural implement of claim 7, wherein the orientation control system comprises:

a first valve assembly configured to control a flow of fluid to the first actuator, wherein the controller is communicatively coupled to the first actuator via the first valve assembly; and a second valve assembly configured to control a flow of fluid to the second actuator, wherein the controller is communicatively coupled to the second actuator via the second valve assembly.

9. The agricultural implement of claim 5, comprising:

a second wing frame pivotally coupled to the main frame, wherein the second wing frame is configured to support a third plurality of ground engaging tools; and a fourth wheel assembly movably coupled to the second wing frame;

wherein the orientation control system comprises:

a fourth sensor mounted to the second wing frame proximate to a ground engaging tool of the third plurality of ground engaging tools, wherein the fourth sensor is directed toward the soil surface, and the fourth sensor is configured to emit a fourth output signal toward the soil surface and to receive a fourth return signal indicative of a fourth height of the second wing frame above the soil surface; and a fifth actuator coupled to the fourth wheel assembly, wherein the fifth actuator is configured to control a vertical position of the fourth wheel assembly relative to the second wing frame;

wherein the controller is communicatively coupled to the fourth sensor and to the fifth actuator, and the controller is configured to control the fifth actuator such that a difference between the fourth height and a fourth target height is less than a fourth threshold value.

* * * * *